US012441132B1

(12) United States Patent
Round

(10) Patent No.: US 12,441,132 B1
(45) Date of Patent: Oct. 14, 2025

(54) SYSTEM FOR ORGANIZING PHYSICAL FILES IN A FOLDER MATRIX WITH TWO DIMENSIONAL AND LINEAR STORAGE/RETRIEVAL CAPABILITY

(71) Applicant: Jack Round, Omaha, NE (US)

(72) Inventor: Jack Round, Omaha, NE (US)

( * ) Notice: Subject to any disclaimer, the term of this patent is extended or adjusted under 35 U.S.C. 154(b) by 251 days.

(21) Appl. No.: 17/876,766

(22) Filed: Jul. 29, 2022

Related U.S. Application Data

(60) Provisional application No. 63/227,945, filed on Jul. 30, 2021.

(51) Int. Cl.
*B42F 7/06* (2006.01)

(52) U.S. Cl.
CPC .................................... *B42F 7/06* (2013.01)

(58) Field of Classification Search
CPC .................................................. B42F 7/06
USPC .................................................. 227/67.1
See application file for complete search history.

(56) References Cited

U.S. PATENT DOCUMENTS 2,431,472 A * 11/1947 Fistell ..................... A45C 1/06 206/37.8
3,018,532 A * 1/1962 Rinaldi ..................... B42F 7/04 281/46
3,154,125 A * 10/1964 Harvey ..................... B42F 7/06 229/67.1
3,187,795 A * 6/1965 Stephenson ............... B42F 7/06 150/147
5,601,681 A * 2/1997 Bayro ....................... B42F 7/06 150/147
6,182,827 B1 * 2/2001 Su ............................ B42F 7/06 229/67.3
2001/0019206 A1 * 9/2001 Deans ....................... B42F 7/06 283/61
2002/0159657 A1 * 10/2002 DeLorme .................. B42F 7/06 229/87.01
2012/0111930 A1 * 5/2012 Maistrellis .............. B42F 21/06 283/37
2018/0015773 A1 * 1/2018 Lee ......................... B42F 7/065

* cited by examiner

*Primary Examiner* — Peter N Helvey
(74) *Attorney, Agent, or Firm* — McGrath North Mullin & Kratz, PC LLO; Jeanne J. Kelley; Luke C. Holst

(57) ABSTRACT

A system for organizing physical files is disclosed, wherein files can be accessed within a folder matrix by employing two dimensional and linear storage/retrieval techniques. In various embodiments, when the folder matrix is in an unfolded configuration, the folders in odd numbered rows of the folder matrix are oriented in a first direction and the folders in even numbered rows of the folder matrix are oriented in a second direction that is opposite the first direction. Consequently, the folders are two dimensionally accessible from selected row and column positions of the folder matrix when the folder matrix is in the unfolded configuration, and the folders are all oriented in a same direction such that the folders are linearly accessible from one side of the folder matrix when the folder matrix is in the folded configuration.

20 Claims, 14 Drawing Sheets

SYSTEM FOR ORGANIZING PHYSICAL FILES IN A FOLDER MATRIX WITH TWO DIMENSIONAL AND LINEAR STORAGE/RETRIEVAL CAPABILITY

CROSS-REFERENCE TO RELATED APPLICATIONS

The present application claims the benefit under 35 U.S.C. § 119 (e) of U.S. Provisional Application No. 63/227,945, filed Jul. 30, 2021, and titled "SYSTEM FOR ORGANIZING PHYSICAL FILES IN A FOLDER MATRIX WITH TWO DIMENSIONAL AND LINEAR STORAGE/RETRIEVAL CAPABILITY," which is incorporated herein by reference in its entirety.

TECHNICAL FIELD

The present disclosure relates to physical filing systems.

BACKGROUND

Systems for organizing physical files are often limited to either linear retrieval and storage techniques or two dimensional retrieval and storage techniques, but rarely both. In a linear system, documents may be loaded and unloaded from a file (e.g., folder) from an opening on one side (e.g., front/top), so that documents can be easily accessed from files that are stacked side-by-side in a drawer or on a shelf. These systems are good for filing documents serially (e.g., alphabetically, numerically, by category, etc.). On the other hand, two dimensional (e.g., multi-flap) organizers allow for sub-folders to be more easily organized within the same file. However, a typical multi-flap organizer must be removed from a drawer/shelf and unfolded to access its contents.

There is a need for a system that can leverage the benefits of linear and two dimensional organizers.

SUMMARY

A system for organizing physical files is disclosed, wherein files can be accessed within a folder matrix by employing two dimensional and linear storage/retrieval techniques.

In an embodiment, the system includes a plurality of folder pockets arranged in a folder matrix. In an unfolded configuration, the folder pockets in odd numbered rows of the folder matrix are oriented in a first direction and the folder pockets in even numbered rows of the folder matrix are oriented in a second direction that is opposite the first direction. The folder pockets are attached to one another by one or more flexible substrates that define (i) a plurality of vertical hinges that couple folder pockets from each column of the folder matrix to adjacent folder pockets of an adjacent column of the folder matrix and (ii) a plurality of horizontal hinges that couple folder pockets from each row of the folder matrix to adjacent folder pockets of an adjacent row of the folder matrix. The system further includes a plurality of folders disposed within the folder pockets, wherein the folders are two dimensionally accessible from selected row and column positions of the folder matrix when the folder matrix is in the unfolded configuration, and wherein the folder pockets are all oriented in a same direction such that the folders are linearly accessible from one side of the folder matrix when the folder matrix is in the folded configuration.

In another embodiment, the system includes a plurality of panels arranged in a folder matrix, wherein each panel includes fasteners configured to retain corners of a respective folder of a plurality of folders disposed within the folder matrix. In an unfolded configuration of the folder matrix, the folders in odd numbered rows of the folder matrix are oriented in a first direction and the folders in even numbered rows of the folder matrix are oriented in a second direction that is opposite the first direction. The panels are attached to one another by one or more flexible substrates that define (i) a plurality of vertical hinges that couple panels from each column of the folder matrix to adjacent panels of an adjacent column of the folder matrix and (ii) a plurality of horizontal hinges that couple panels from each row of the folder matrix to panels of an adjacent row of the folder matrix. The folders are two dimensionally accessible from selected row and column positions of the folder matrix when the folder matrix is in the unfolded configuration, and the folders are all oriented in a same direction such that the folders are linearly accessible from one side of the folder matrix when the folder matrix is in the folded configuration.

In another embodiment, the system includes a plurality of panels arranged in a folder matrix, wherein each panel includes fasteners configured to retain corners of a respective folder of a plurality of folders disposed within the folder matrix. In an unfolded configuration of the folder matrix, the folders in odd numbered rows of the folder matrix are oriented in a first direction and the folders in even numbered rows of the folder matrix are oriented in a second direction that is opposite the first direction. The panels are attached to one another by one or more flexible substrates that define (i) a plurality of vertical hinges that couple panels from every other column of the folder matrix to adjacent panels of an adjacent column of the folder matrix and (ii) a plurality of horizontal hinges that couple panels from each row of the folder matrix to panels of an adjacent row of the folder matrix. The system may further include a plurality of cutouts formed between panels of the folder matrix that are not coupled together by vertical hinges. The folders are two dimensionally accessible from selected row and column positions of the folder matrix when the folder matrix is in the unfolded configuration, and the folders are all oriented in a same direction such that the folders are linearly accessible from one side of the folder matrix when the folder matrix is in the folded configuration. Furthermore, the cutouts may enable any of the folders to be accessed two dimensionally by unfolding the folder matrix along a vertical or horizontal hinge. This will provide access to two folders at a time without having to fully unfold the folder matrix.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Reference will now be made in detail to the subject matter disclosed, which is illustrated in the accompanying drawings.

FIGS. 1 through 14 illustrate various example embodiments of a system 100 for organizing physical files, wherein files can be accessed within a folder matrix 104 by employing two dimensional and linear storage/retrieval techniques. When the folder matrix 104 is in an unfolded configuration, folders 108 in odd numbered rows of the folder matrix 104 are oriented in a first direction and the folders 108 in even numbered rows of the folder matrix 104 are oriented in a second direction that is opposite the first direction. Consequently, the folders 108 are two dimensionally accessible from selected row and column positions of the folder matrix 104 when the folder matrix 104 is in the unfolded configuration, and the folders 108 are all oriented in a same direction such that the folders 108 are linearly accessible from one side of the folder matrix 104 when the folder matrix 104 is in the folded configuration.

Figure 1:
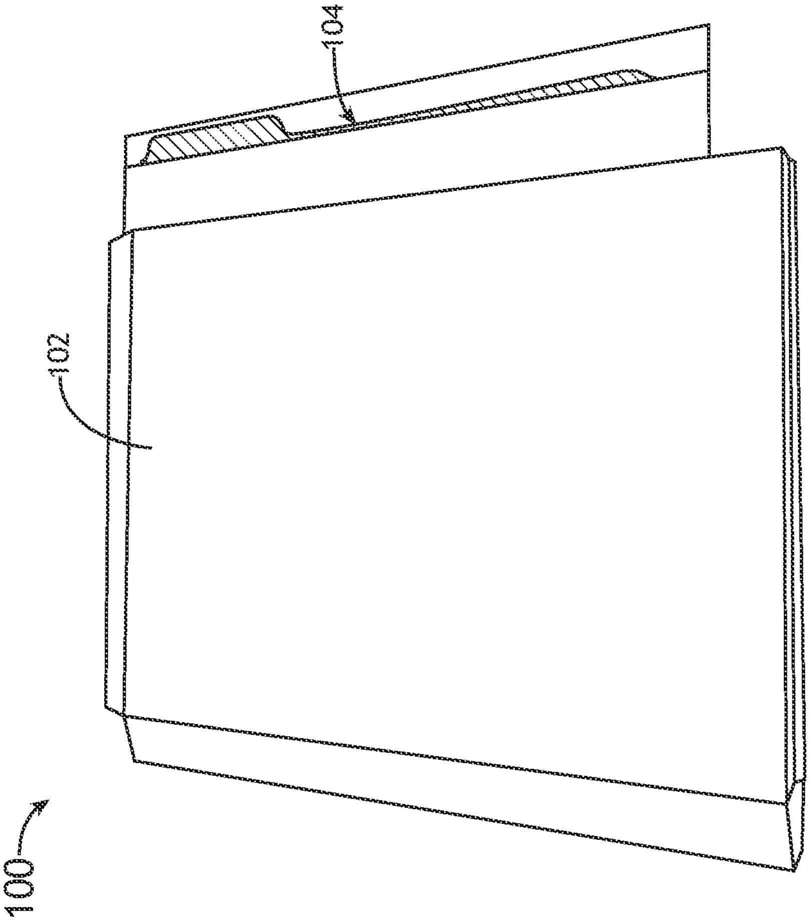
FIG. 1 illustrates a system for organizing files, wherein a folder matrix of the system is folded and disposed within a sleeve, in accordance with an example embodiment of this disclosure.
Figure 2:
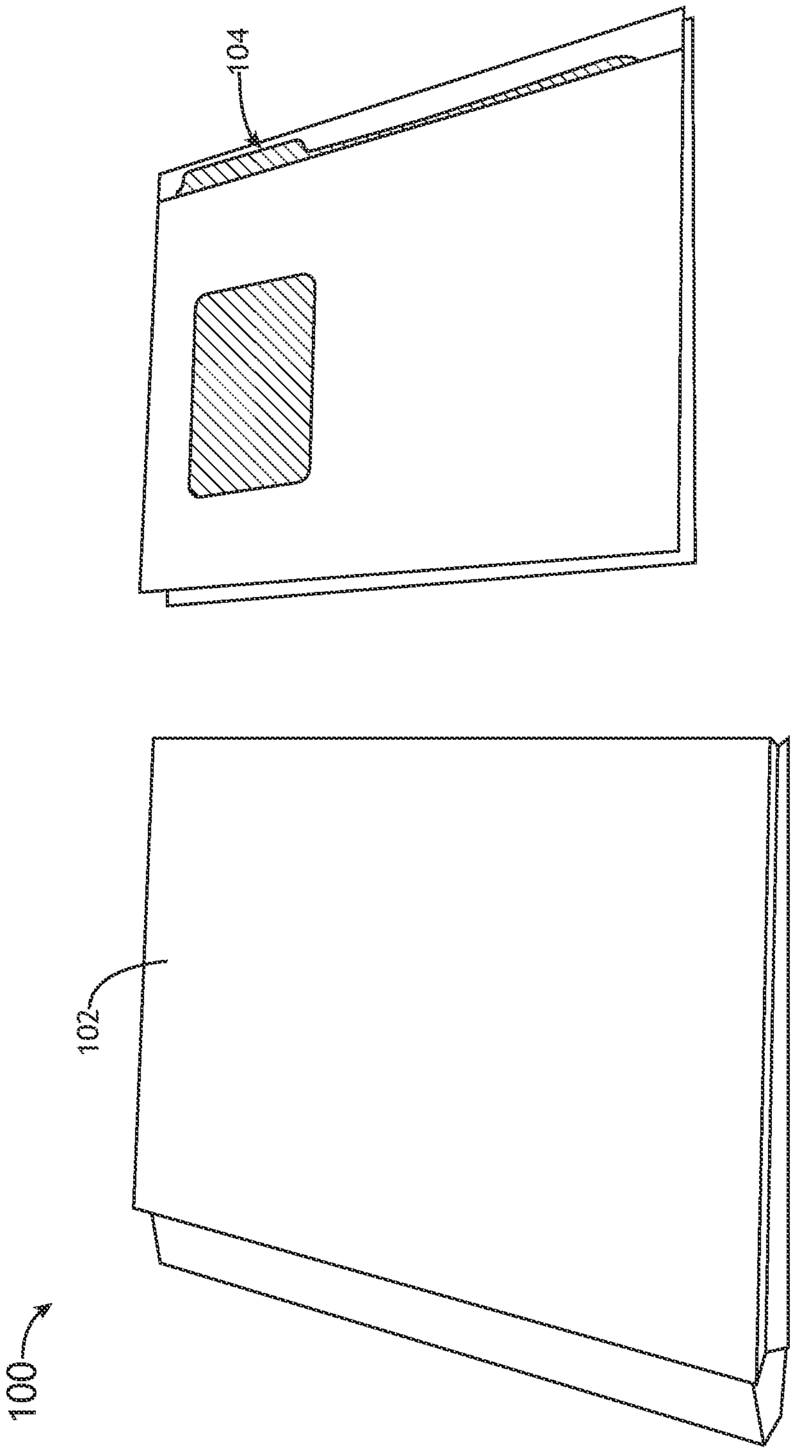
FIG. 2 illustrates the system for organizing files, wherein the folder matrix of the system is folded and removed from the sleeve, in accordance with an example embodiment of this disclosure.
Figure 3:
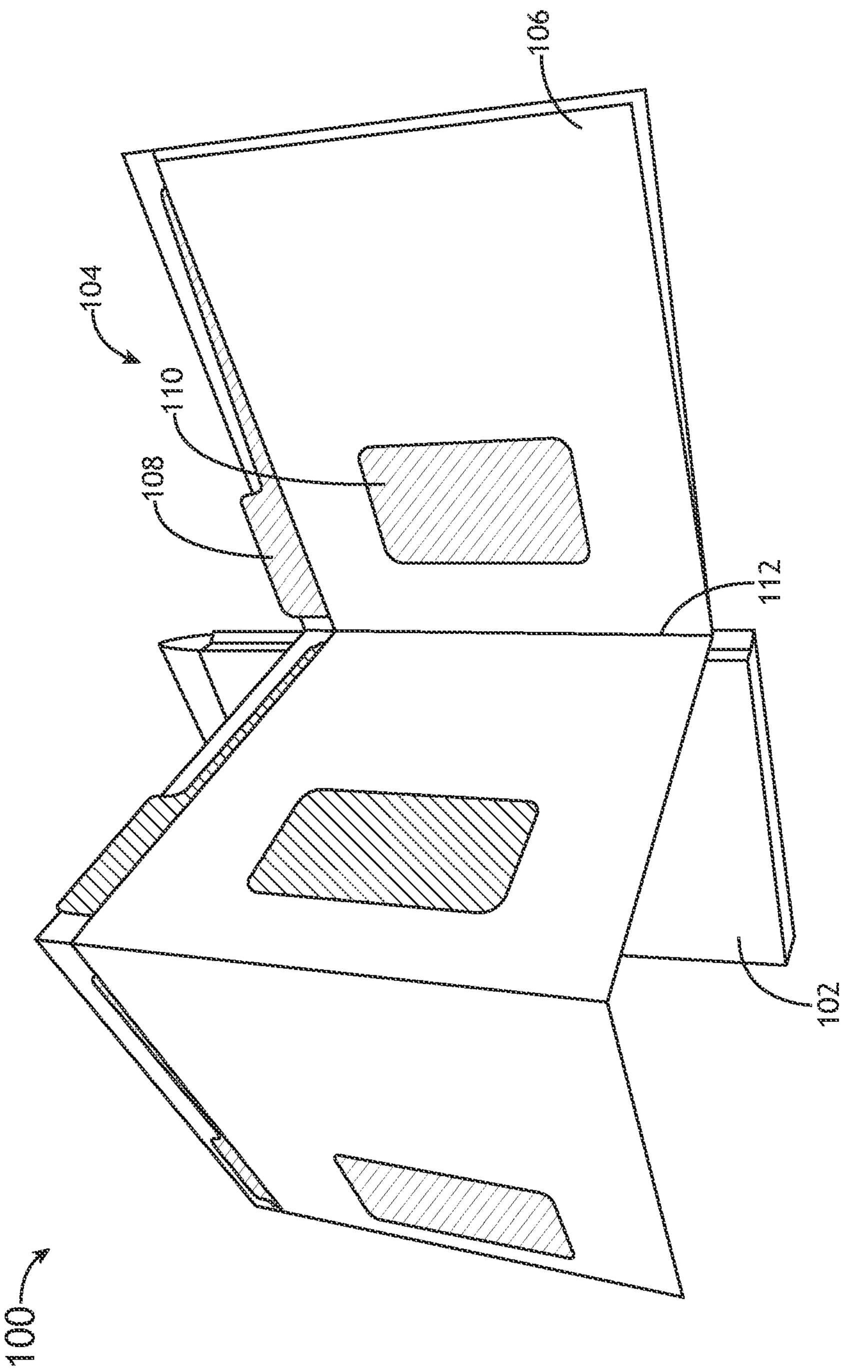
FIG. 3 illustrates the system for organizing files, wherein the folder matrix of the system is partially unfolded, in accordance with an example embodiment of this disclosure.
Figure 4:
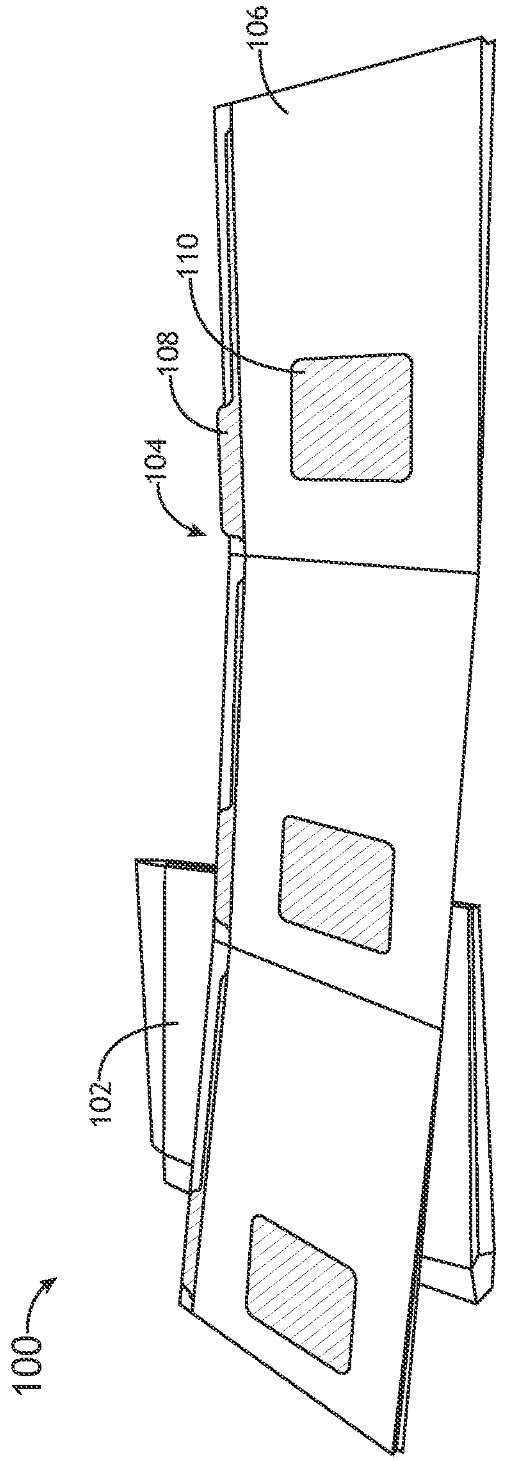
FIG. 4 illustrates the system for organizing files, wherein the folder matrix of the system is partially unfolded, in accordance with an example embodiment of this disclosure.
Figure 5:
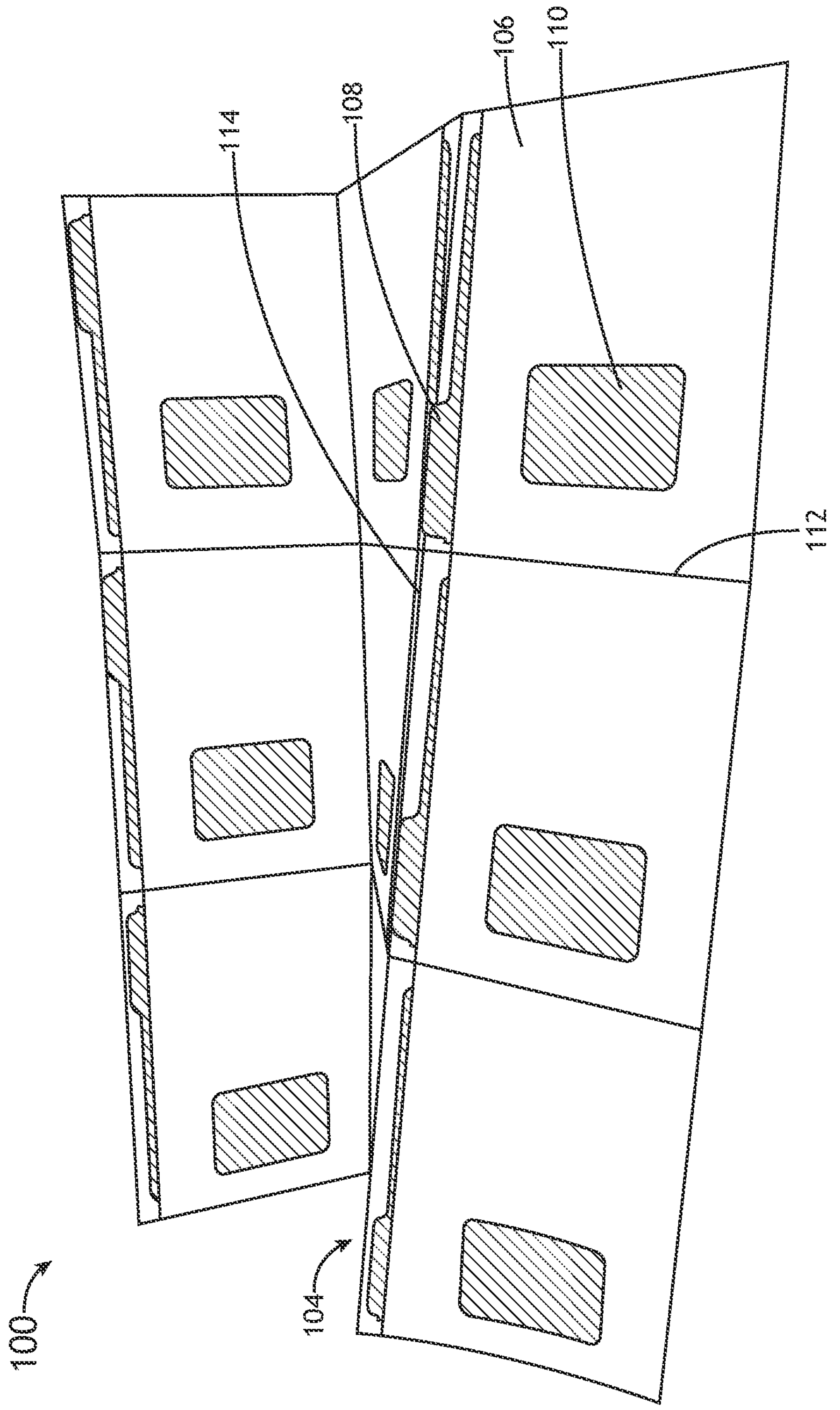
FIG. 5 illustrates the system for organizing files, wherein the folder matrix of the system is partially unfolded, in accordance with an example embodiment of this disclosure.
Figure 6:
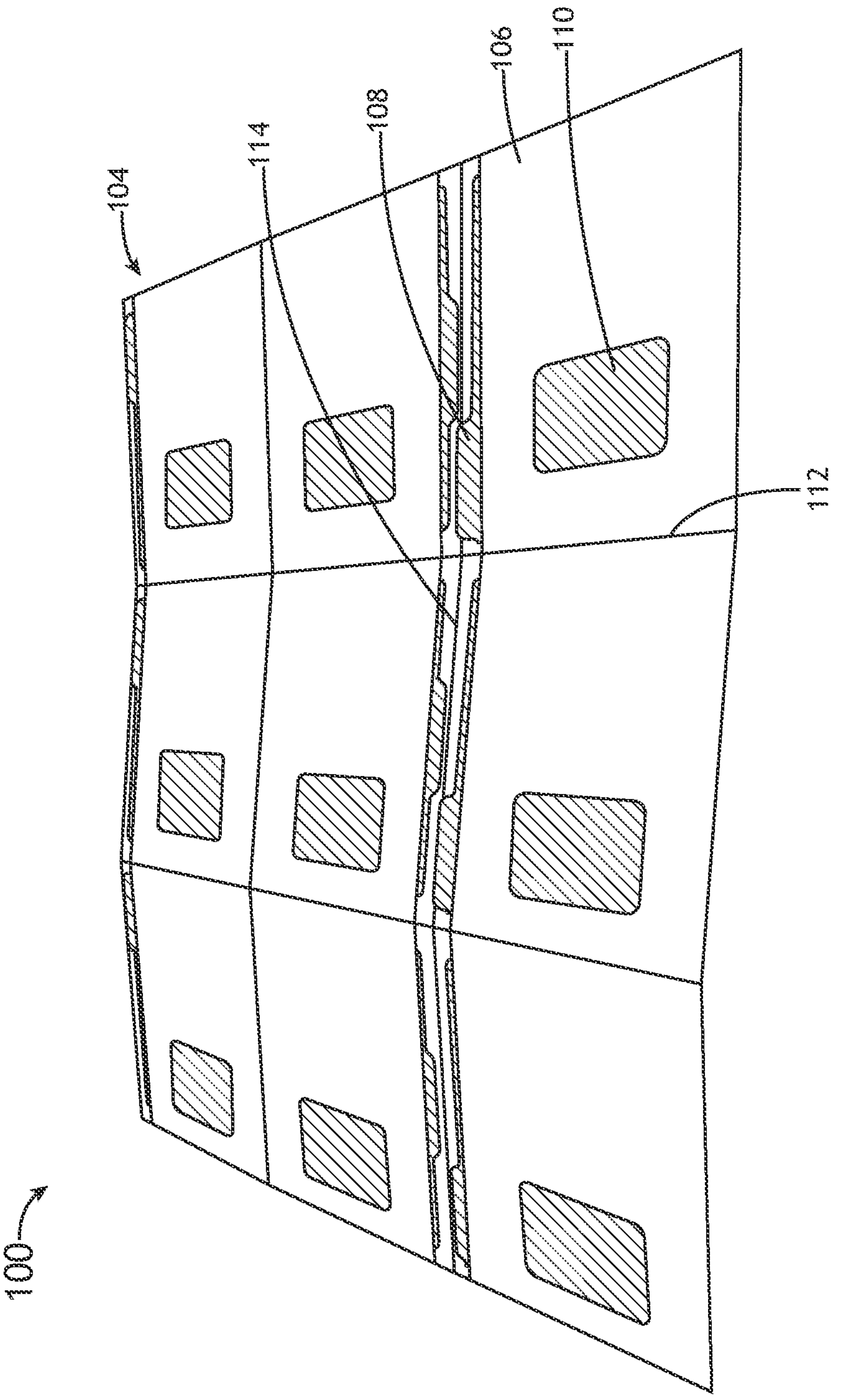
FIG. 6 illustrates the system for organizing files, wherein the folder matrix of the system is fully unfolded, in accordance with an example embodiment of this disclosure.

In embodiments of the system 100, such as the embodiment illustrated in FIGS. 1 through 9, a plurality of folder pockets 106 are arranged within the folder matrix 104. As shown in FIG. 6, when the folder matrix 104 is in an unfolded configuration, the folder pockets 106 in odd numbered rows of the folder matrix 104 are oriented in a first direction and the folder pockets 106 in even numbered rows of the folder matrix 104 are oriented in a second direction that is opposite the first direction.

The folder pockets 106 may be attached to one another by one or more flexible substrates (e.g., clear tape or a flexible sheet with applied adhesive) that define (i) a plurality of vertical hinges 112 that couple folder pockets 106 from each column of the folder matrix 104 to adjacent folder pockets 106 of an adjacent column of the folder matrix 104 and (ii) a plurality of horizontal hinges 114 that couple folder pockets 106 from each row of the folder matrix 104 to adjacent folder pockets 106 of an adjacent row of the folder matrix 104. In some embodiments, the folder pockets 106 themselves are formed by a portion of the flexible substrate (e.g., paper, cardstock, cardboard, and/or plastic/polymer) material. For example, two or more sheets of substrate material may be glued, fused, fastened, or otherwise coupled together to form the folder pockets 106. In some embodiments, the substrate material may be etched, creased, or otherwise thinned at the hinges to achieve appropriate flexibility characteristics.

Figure 7:
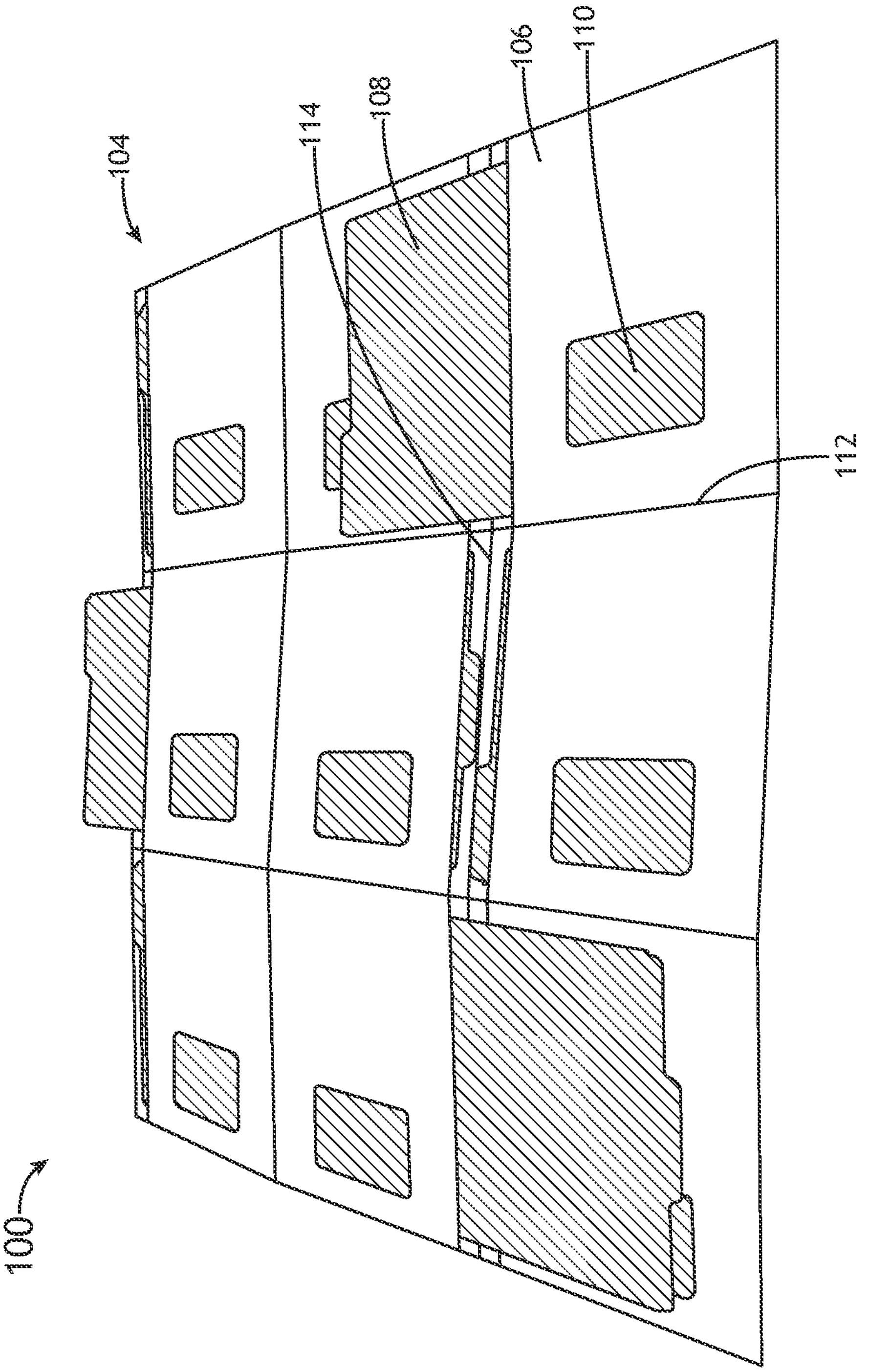
FIG. 7 illustrates the system for organizing files, wherein the folder matrix of the system is fully unfolded, and wherein some folders are removed from their respective folder pockets, in accordance with an example embodiment of this disclosure.
Figure 8:
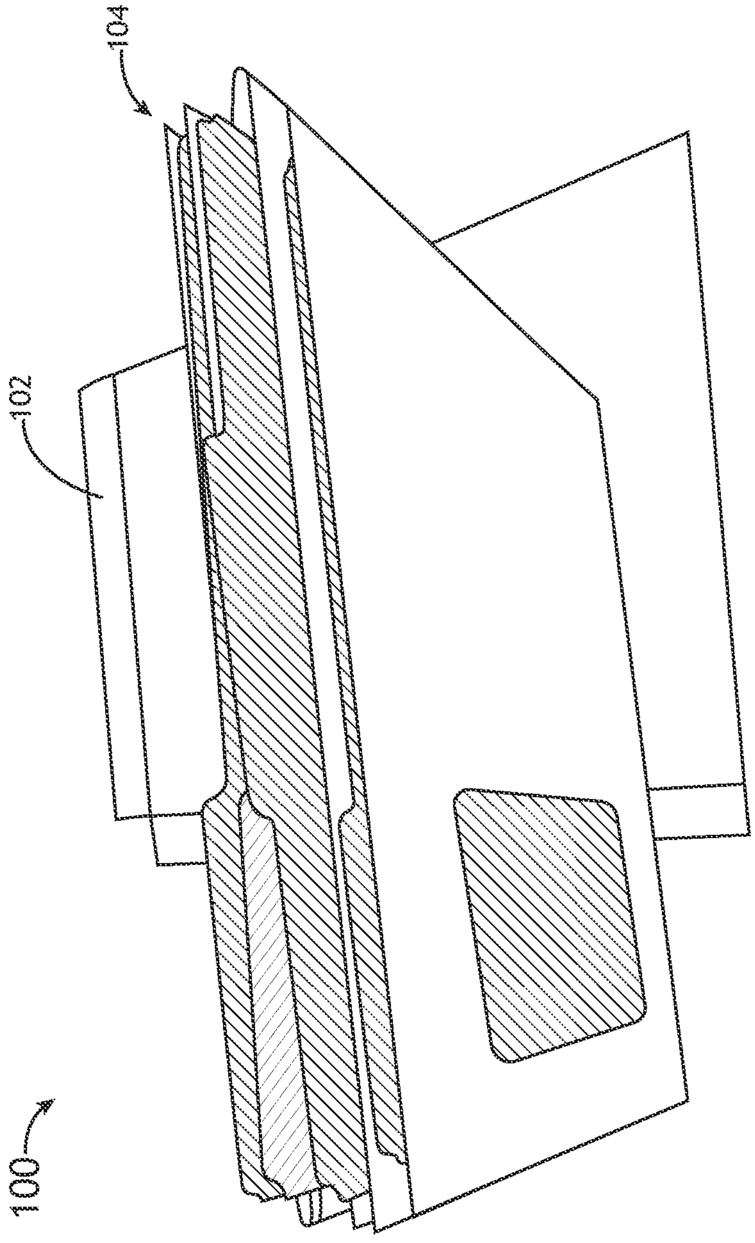
FIG. 8 illustrates the system for organizing files, wherein the folder matrix of the system is folded with all of the folder pockets oriented in the same direction so that all of the folders can be accessed (linearly) from one side of the folded-up folder matrix, in accordance with an example embodiment of this disclosure.
Figure 9:
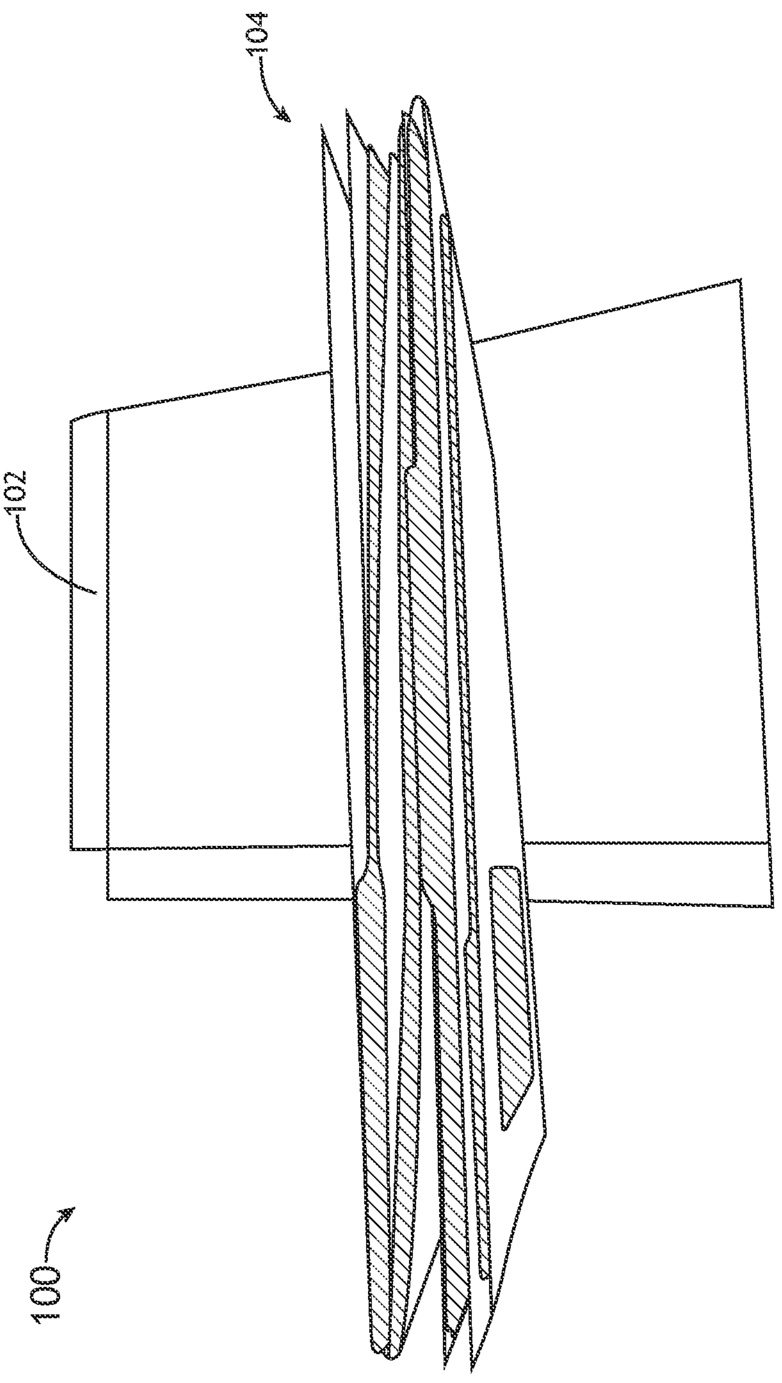
FIG. 9 illustrates the system for organizing files, wherein the folder matrix of the system is folded with all of the folder pockets oriented in the same direction so that all of the folders can be accessed (linearly) from one side of the folded-up folder matrix, in accordance with an example embodiment of this disclosure.

As shown in FIGS. 6 and 7, the system 100 may include a plurality of folders 108 disposed within the folder pockets 106, wherein the folders 108 are two dimensionally accessible from selected row and column positions of the folder matrix 104 when the folder matrix 104 is in the unfolded configuration (i.e., fully unfolded). As shown in FIGS. 8 and 9, the folder pockets 106 are all oriented in the same direction (e.g., with all openings on the top/front) such that the folders 108 are linearly accessible from one side of the folder matrix 104 when the folder matrix 104 is in the folded configuration (i.e., completely folded-up).

In some embodiments, the system 100 further includes a sleeve 102 configured to contain the folder matrix 104 when the folder matrix 104 is in the folded configuration. For example, FIGS. 1 through 5 illustrate an example of removing the folder matrix 104 from the sleeve 102 and unfolding the folder matrix 104 until it is fully unfolded in FIG. 6. The same process can be performed in reverse to fold up the folder matrix 104 and stow it within the sleeve 102.

Figure 10:
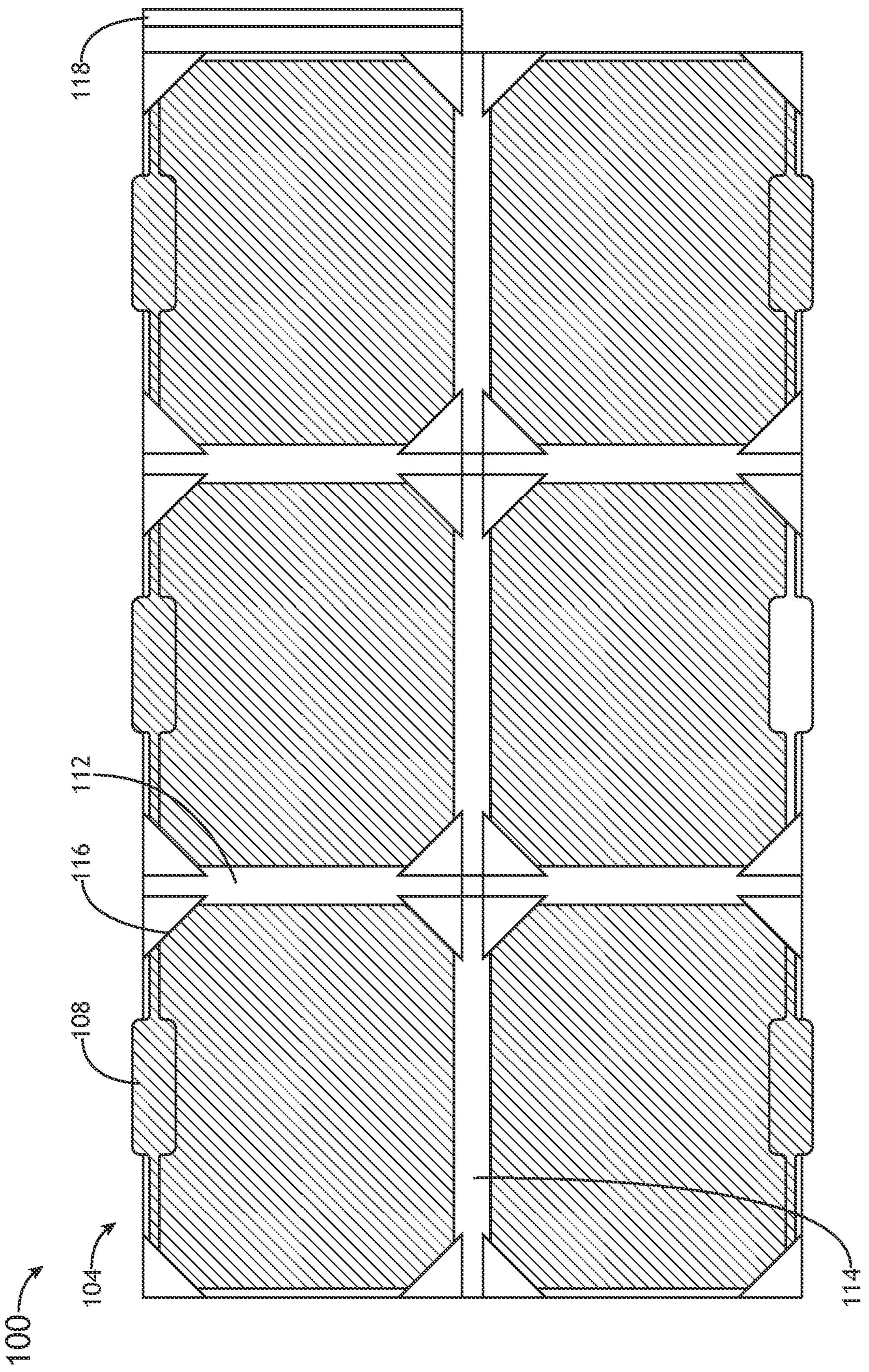
FIG. 10 illustrates the system for organizing files, wherein each panel of the folder matrix includes fasteners configured to receive corners of a respective folder instead of a folder pocket at each panel of the folder matrix, wherein the folder matrix of the system is fully unfolded, in accordance with an example embodiment of this disclosure.
Figure 11:
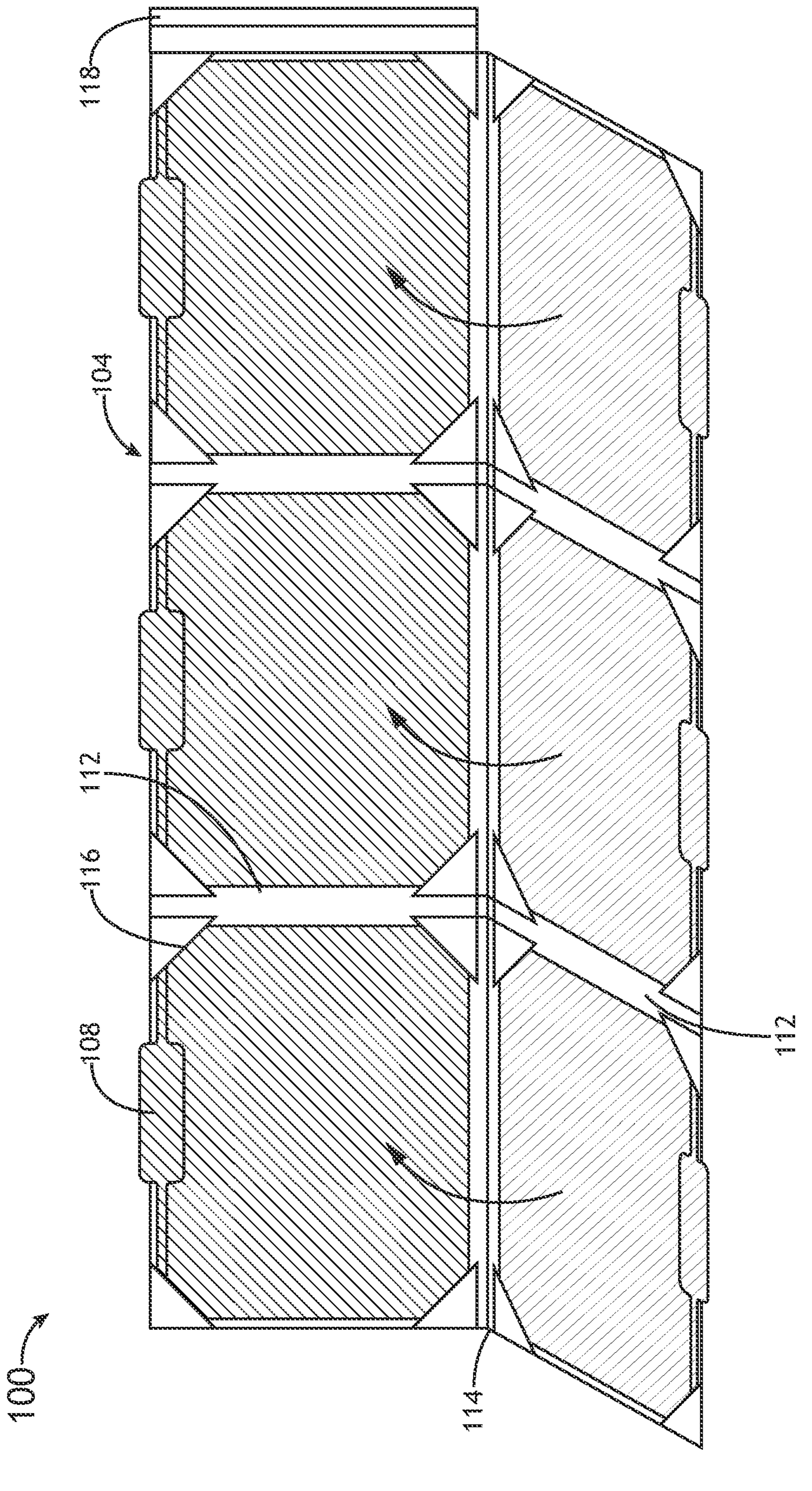
FIG. 11 illustrates the system for organizing files, wherein each panel of the folder matrix includes fasteners configured to receive corners of a respective folder instead of a folder pocket at each panel of the folder matrix, wherein the folder matrix of the system is partially folded, in accordance with an example embodiment of this disclosure.
Figure 12:
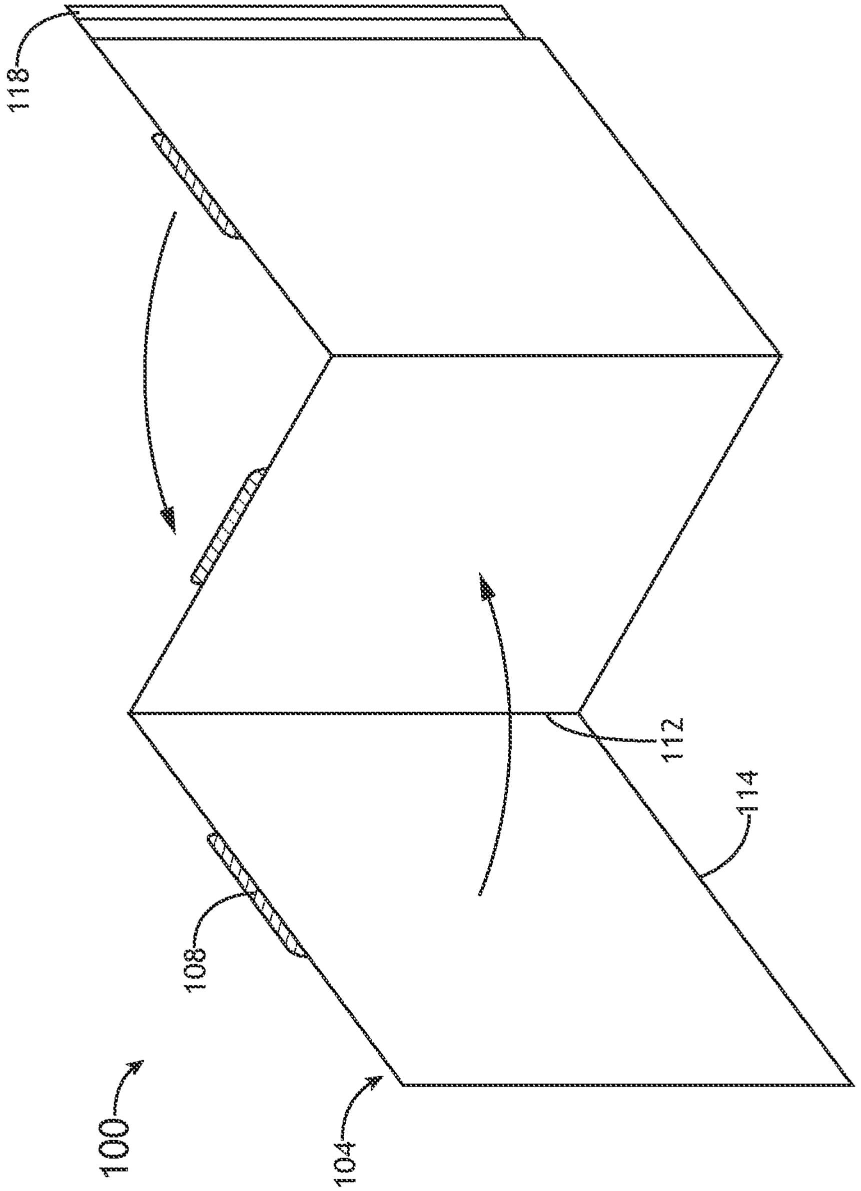
FIG. 12 illustrates the system for organizing files, wherein each panel of the folder matrix includes fasteners configured to receive corners of a respective folder instead of a folder pocket at each panel of the folder matrix, wherein the folder matrix of the system is partially folded, in accordance with an example embodiment of this disclosure.
Figure 13:
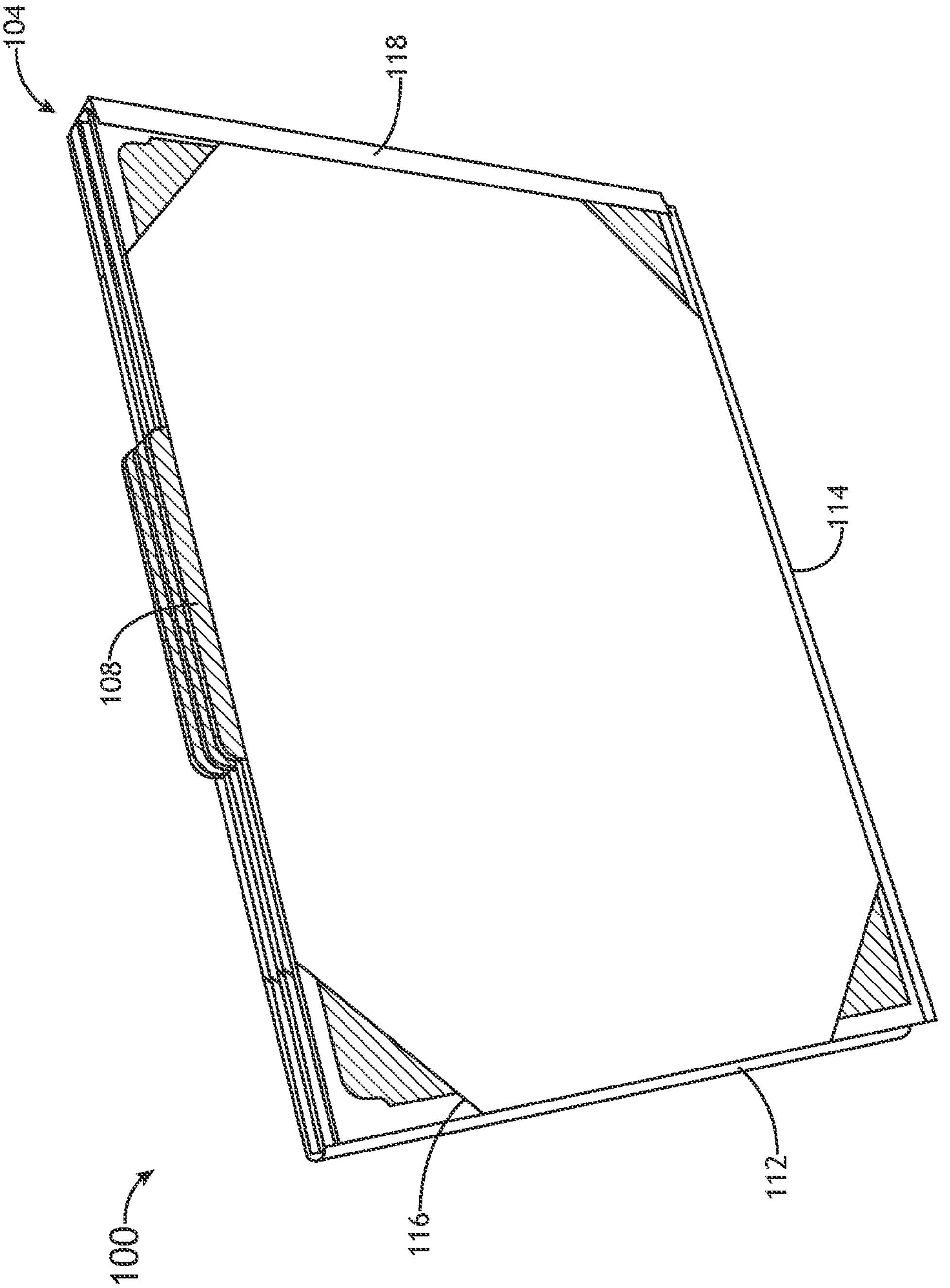
FIG. 13 illustrates the system for organizing files, wherein each panel of the folder matrix includes fasteners configured to receive corners of a respective folder instead of a folder pocket at each panel of the folder matrix, wherein the folder matrix of the system is folded with all of the folder pockets oriented in the same direction so that all of the folders can be accessed (linearly) from one side of the folded-up folder matrix, in accordance with an example embodiment of this disclosure.

Alternatively, or in addition to the sleeve 102, the system 100 may include a flap configured to hold the folder matrix 104 together when the folder matrix 104 is in the folded configuration. For example, FIG. 10 illustrates a different embodiment of the system 100 with a flap 118 that extends from a first or last row of the folder matrix 104 when the folder matrix 104 is in the unfolded configuration. As shown in FIG. 13, the flap 118 wraps around a portion of the folder matrix 104 and holds it together when the folder matrix 104 is folded-up. The system 100 as illustrated in FIGS. 1 through 9, can also be structured to include a flap; similarly, the system 100 as illustrated in FIGS. 10 through 14 may include a sleeve in some embodiments (with/without the flap 118).

In some embodiments, each of the folder pockets 106 is color coded. For example, each of the folder pockets 106 may include a colored label 110. In some embodiments, each of the folders 108 is also color coded to match its respective folder pocket 106. For example, the folders 108 may be the same color as respective labels 110. Alternatively, color coding may be applied to only the folder pockets 106 or only the folders 108. Color coding may be applied to any of the embodiments described herein.

In alternative embodiments of the system 100, such as the embodiments illustrated in FIGS. 10 through 14, the folder matrix 104 includes a plurality of panels made of a continuous substrate material (e.g., paper, cardboard, cardstock, plastic/polymer, etc.) or discrete portions of substrate material that are coupled together (e.g., glued, fused, or fastened together).

Each panel of the folder matrix 104 may include fasteners 116 that are configured to retain corners of a respective folder 108 of the plurality of folders 108 disposed within the folder matrix 104. In some embodiments, the fasteners 116 are formed by slits in the substrate material or additional portions of substrate material (e.g., corner pieces of substrate material) attached to the substrate material that forms each panel. In other embodiments, the fasteners 116 may include bands, clips, or other types of fasteners.

The panels may be attached to one another by one or more flexible substrates (e.g., clear tape or a flexible sheet with applied adhesive) that define (i) a plurality of vertical hinges 112 that couple panels from each column of the folder matrix 104 to adjacent panels of an adjacent column of the folder matrix 104 and (ii) a plurality of horizontal hinges 114 that couple panels from each row of the folder matrix 104 to adjacent panels of an adjacent row of the folder matrix 104. In preferred embodiments, the panels themselves may be formed by the substrate (e.g., paper, cardstock, cardboard, and/or plastic/polymer) material. For example, the entire folder matrix 104 can be formed by a continuous sheet of substrate material. The substrate material may be etched, creased, or otherwise thinned at the hinges to achieve appropriate flexibility characteristics.

As shown in FIG. 10, when the folder matrix 104 is in an unfolded configuration, the folders 108 in odd numbered rows of the folder matrix 104 are oriented in a first direction and the folders 108 in even numbered rows of the folder matrix 104 are oriented in a second direction that is opposite the first direction. The folders 108 are two dimensionally accessible from selected row and column positions of the folder matrix 104 when the folder matrix 104 is in the unfolded configuration (i.e., fully unfolded). As shown in FIGS. 13, the folder pockets 106 are all oriented in the same direction (e.g., with all openings on the top/front) such that the folders 108 are linearly accessible from one side of the folder matrix 104 when the folder matrix 104 is in the folded configuration (i.e., completely folded-up).

In some embodiments, the system 100 includes a flap 118 configured to hold the folder matrix 104 together when the folder matrix 104 is in the folded configuration. The flap 118 may extend from a first or last row of the folder matrix 104 when the folder matrix 104 is in the unfolded configuration. FIGS. 11 through 13 illustrate an example of folding up the folder matrix 104 so that it is held together by the flap 118 when fully folded-up (see FIG. 13). The same process can be performed in reverse to unfold the folder matrix 104 in order to provide two dimensional access to the folders 108. As shown in FIG. 13, the flap 118 wraps around a portion of the folder matrix 104 and holds it together when the folder matrix 104 is folded-up.

Alternatively, or in addition to the flap 118, the system 100 may include a sleeve configured to contain the folder matrix 104 when the folder matrix 104 is in the folded configuration. For example, as previously noted herein, the system 100 as illustrated in FIGS. 10 through 14 may include a sleeve (similar to sleeve 102), either in addition to or in lieu of the flap 118.

Figure 14:
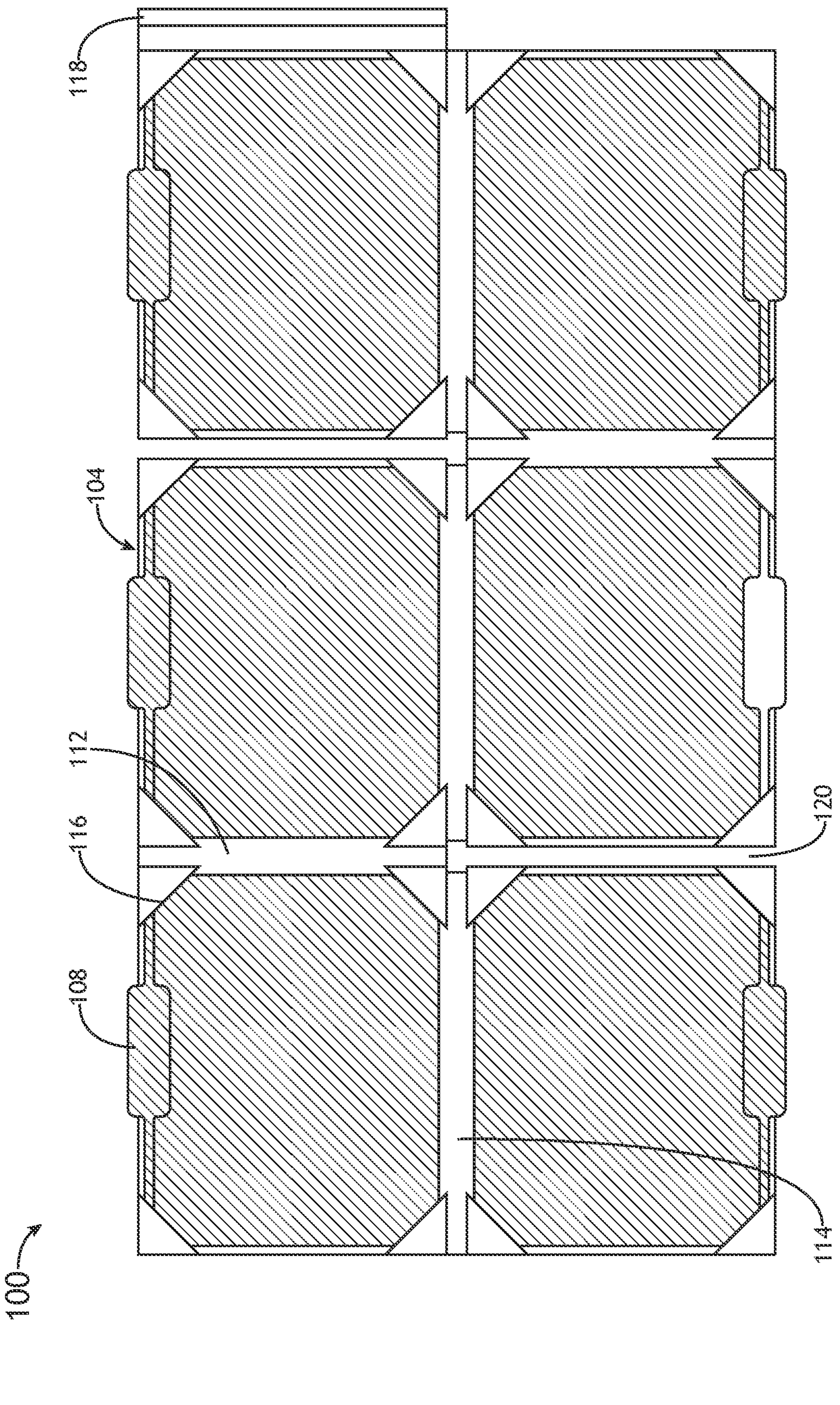
FIG. 14 illustrates the system for organizing files, wherein each panel of the folder matrix includes fasteners configured to receive corners of a respective folder instead of a folder pocket at each panel of the folder matrix, and the folder matrix further includes cutouts instead of hinges between second and third panels of the folder matrix in the first row and between first and second panels of the folder matrix in the second row, so that any of the folders can be accessed two dimensionally by unfolding the folder matrix along a vertical/horizontal hinge without having to fully unfold the folder matrix, in accordance with an example embodiment of this disclosure.

FIG. 14 illustrates a slightly modified version of the embodiment illustrated in FIGS. 10 through 13. Instead of having vertical hinges 112 that couple panels from each column of the folder matrix 104 to adjacent panels of an adjacent column of the folder matrix 104, the embodiment of the system in FIG. 14 includes vertical hinges 112 that couple panels from every other column of the folder matrix 104 to adjacent panels of an adjacent column of the folder matrix 104. Meanwhile, the system 100 includes cutouts 120 formed between the panels of the folder matrix 104 that are not coupled together by vertical hinges 112. The cutouts 120 from one row are adjacent to the vertical hinges 112 from an adjacent row so that the vertical hinges 112 and cutouts 120 are staggered. For example, the folder matrix 104 in FIG. 14 is shown to include cutouts 120 instead of vertical hinges 112 between second and third panels of the folder matrix 104 in the first row and between first and second panels of the folder matrix 104 in the second row. In this configuration, the folders 108 will still be two dimensionally accessible from selected row and column positions of the folder matrix 104 when the folder matrix 104 is in the unfolded configuration, and the folders 108 will all be oriented in the same direction such that the folders 108 are linearly accessible from one side of the folder matrix 104 when the folder matrix 104 is in the folded configuration. After the folder matrix 104 is completely folded-up (e.g., as shown in FIG. 13), the cutouts 120 enable any of the folders 108 to be accessed two dimensionally by unfolding the folder matrix 104 along one of the vertical hinges 112 or the horizontal hinges 114. This will provide access to two folders 108 at a time without having to fully unfold the folder matrix 104.

In preferred embodiments, the folder matrix 104 is at least a 2×2 matrix. For example, the folder matrix 104 may be a 3×3 matrix (as shown in FIGS. 1 through 9) or a 3×2 matrix (as shown in FIGS. 10 through 14), or a 2×2 matrix, 2×3 matrix, 2×4 matrix, 3×4 matrix, 4×4 matrix, 4×3 matrix, 4×2 matrix, and so forth. However, the system 100 may be configured to hold more or less folders 108 depending on the applications. Furthermore, various structural variations are contemplated. For example, the system 100 may be composed of different materials, such as, but not limited to, clear/opaque polymer sheet, paper, cardstock, cardboard, and various plastics/polymers. The system 100 may also have differing color schemes, or differing form factors to hold different sizes of paper/materials (e.g., a smaller form factor for index cards, etc.).

Although the technology has been described with reference to the embodiments illustrated in the attached drawing figures, equivalents may be employed, and substitutions may be made herein without departing from the scope of the technology as recited in the claims. Components illustrated and described herein are examples of devices and components that may be used to implement the embodiments of the present invention and may be replaced with other devices and components without departing from the scope of the invention. Furthermore, any dimensions, degrees, and/or numerical ranges provided herein are to be understood as non-limiting examples unless otherwise specified in the claims.

What is claimed is:

1. A system for organizing physical files, comprising:
- a plurality of folder pockets arranged in a folder matrix the folder matrix comprising:
  - one or more columns of folder pockets;
  - one or more rows of folder pockets;
  - one or more flexible substrates;
- the flexible substrates comprising one or more vertical hinges, wherein the one or more vertical hinges each couple adjacent columns of the folder pockets;
- the flexible substrates comprising one or more horizontal hinges, wherein the one or more horizontal hinges couple adjacent rows of the folder pockets;
- the plurality of folder pockets comprising at least one opening;
- the plurality of folder pockets configured to allow for access to the opening in each a folded and an unfolded configuration of the folder matrix;
- wherein in the unfolded configuration of the folder matrix, the opening of the folder pockets in odd numbered rows of the folder matrix are oriented in a first direction and the opening of the folder pockets in even numbered rows of the folder matrix are oriented in a second direction that is opposite the first direction;
- wherein in the folded configuration of the folder matrix, the opening of the folder pockets are oriented in the same direction.

2. The system of claim 1, further comprising:
- a sleeve configured to contain the folder matrix when the folder matrix is in the folded configuration.

3. The system of claim 1, further comprising:
- a flap configured to hold the folder matrix together when the folder matrix is in the folded configuration.

4. The system of claim 3, wherein the flap extends from a first or last row of the folder matrix when the folder matrix is in the unfolded configuration.

5. The system of claim 1, wherein each of the folder pockets is color coded.

6. The system of claim 5, wherein each of the folders is also color coded to match a respective folder pocket of the plurality of folder pockets.

7. The system of claim 1, wherein the folder matrix is at least a 2×2 matrix.

8. The system of claim 1, wherein the folder matrix is a 3×2 or a 3×3 matrix.

9. A system for organizing physical files, comprising:
- a plurality of folder pockets arranged in a folder matrix, the folder matrix comprising:
  - one or more columns of folder pockets;
  - one or more rows of folder pockets;
  - one or more flexible substrates;
- the flexible substrates comprising one or more vertical hinges, wherein the one or more vertical hinges each couple adjacent columns of the folder pockets;
- the flexible substrates comprising one or more horizontal hinges, wherein the one or more horizontal hinges couple adjacent rows of the folder pockets;
- the plurality of folder pockets comprising at least one opening;
- at least one folder disposed in at least one opening;
- the plurality of folder pockets configured to allow for access to the opening in each a folded and an unfolded configuration of the folder matrix;
- wherein in the unfolded configuration of the folder matrix, the opening of the folder pockets in odd numbered rows of the folder matrix are oriented in a first direction and the opening of the folder pockets in even numbered rows of the folder matrix are oriented in a second direction that is opposite the first direction;
- wherein in the folded configuration of the folder matrix, the opening of the folder pockets are oriented in the same direction.

10. The system of claim 9, further comprising:
- a sleeve configured to contain the folder matrix when the folder matrix is in the folded configuration.

11. The system of claim 9, further comprising:
- a flap configured to hold the folder matrix together when the folder matrix is in the folded configuration.

12. The system of claim 11, wherein the flap extends from a first or last row of the folder matrix when the folder matrix is in the unfolded configuration.

13. The system of claim 9, wherein each of the folder pockets is color coded.

14. The system of claim 9, wherein the folder matrix is at least a 2×2 matrix.

15. The system of claim 9, wherein the folder matrix is a 3×2 or a 3×3 matrix.

16. The system of claim 1, further comprising at least one folder disposed within at least one of the folder pockets.

17. A system for organizing physical files, comprising:
- a plurality of panels arranged in a folder matrix,
- the folder matrix comprising:
  - one or more columns of panels;
  - one or more rows of panels
  - one or more flexible substrates;
- the flexible substrates comprising one or more vertical hinges, wherein the one or more vertical hinges each couple adjacent columns of the panel;
- the flexible substrates comprising one or more horizontal hinges, wherein the one or more horizontal hinges couple adjacent rows of the panel;
- a folder;
- the panel comprising at least one fastener configured to retain corners of the folder;
- the folder comprising at least one opening;
- the folder configured to allow for access to the opening in each a folded and an unfolded configuration of the folder matrix;

wherein in the unfolded configuration of the folder matrix, the opening of the folder in odd numbered rows of the folder matrix are oriented in a first direction and the opening of the folder in even numbered rows of the folder matrix are oriented in a second direction that is opposite the first direction;

wherein in the folded configuration of the folder matrix, the opening of the folders are oriented in the same direction.

18. The system of claim 17, further comprising:

a sleeve configured to contain the folder matrix when the folder matrix is in the folded configuration.

19. The system of claim 17, further comprising:

a flap configured to hold the folder matrix together when the folder matrix is in the folded configuration.

20. The system of claim 17, wherein the folder matrix is at least a 2×2 matrix.

* * * * *